UNITED STATES PATENT OFFICE.

FRIEDRICH RUNKEL, OF ELBERFELD, GERMANY, ASSIGNOR TO FARBENFABRIKEN OF ELBERFELD CO., OF NEW YORK, N. Y., A CORPORATION OF NEW YORK.

YELLOW AZO DYE AND PROCESS OF MAKING SAME.

SPECIFICATION forming part of Letters Patent No. 719,048, dated January 27, 1903.

Application filed October 11, 1902. Serial No. 126,941. (No specimens.)

*To all whom it may concern:*

Be it known that I, FRIEDRICH RUNKEL, doctor of philosophy, chemist, (assignor to the FARBENFABRIKEN OF ELBERFELD CO., of New York,) residing at Elberfeld, Germany, have invented a new and useful Improvement in Yellow Azo Dye and Process of Making Same; and I hereby declare the following to be a clear and exact description of my invention.

My invention relates to the production of new valuable azo dyestuffs by combining indol compounds—such as $Pr_2$-methylindol, (alpha-methylindol,) $B_3$-$Pr_2$-dimethylindol, $B_3$-chloro-$Pr_2$-methylindol, or their derivatives alkylated in the imido group or the like—with diazo compounds containing sulfonic groups. The said indol derivatives can be prepared according to the method of E. Fischer (see *Annalen der Chemie*, Vol. 236, pages 153 to 155) by melting together the corresponding ketohydrazones and zinc chlorid.

The said new dyestuffs are from yellow to brown powders, soluble in water and in ammonia and dyeing wool from yellow to orange and to brown shades.

In carrying out my new process practically I can proceed as follows, the parts being by weight: 17.3 parts of parasulfanilic acid are diazotized in the usual manner and to the resulting diazo compound diluted with water is slowly added a solution of 13.1 parts of alpha-methylindol ($Pr_2$-methylindol) having the formula

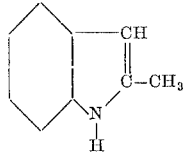

dissolved in fifty-three parts of concentrated hydrochloric acid. It is stirred for about twelve hours, filtered off, washed, dissolved into a hot solution of 6.5 parts of sodium carbonate in five hundred parts of water, and the dyestuff precipitated again by the addition of common salt.

The new coloring-matter represents a yellow powder, being soluble in water, alcohol, and ammonia with a yellow color. It is dissolved by concentrated sulfuric acid of 66° Baumé with a yellow color. It dyes wool greenish-yellow shades fast to the action of light, acids, and alkalies.

The process proceeds in an analogous manner if other indol derivatives or if other diazo compounds, diazo-azo compounds, or tetrazo compounds containing sulfonic groups or the like are used.

Hereunder I give the shades of some of the new dyestuffs.

| Dyestuff prepared by combination of diazotized— | With— | Dyes wool from acid-bath— |
|---|---|---|
| Para-sulfanilic acid | $Pr_{1n}$-2 dimethylindol | Yellow. |
| Ortho-toluidin sulfonic acid ($CH_3^2:NH_2^1:SO_3^5H$) | $B_r$-chloro-$Pr_2$-methylindol | Yellow. |
| Para-toluidin sulfonic acid ($CH_3^1:NH_2^4:SO_3^2H$) | $B_3$-chloro-$Pr_{1n}$-ethyl-2 methylindol | Orange-yellow. |
| Ortho-chloroanilin sulfonic acid ($Cl^1:NH_2^2:SO_3^4H$) | $B_3$-methyl-$Pr_{1n}$-ethyl-2 methylindol | Yellow. |
| Para-nitranilin sulfonic acid ($NH_2^1:NO_2^4:SO_3^3H$) | $Pr_2$-methylindol | Orange. |
| Alpha-naphthylamin sulfonic acid 1:4. | $B_3$-$Pr_{1n}$-2-trimethylindol | Orange-yellow. |
| Beta-naphthylamin sulfonic acid 2:6. | $Pr_{1n}$-methylindol | Yellow. |
| Amidoazobenzene disulfonic acid. | $Pr_{1n}$-methylindol | Brown. |
| Alpha-naphthylamin disulfonic acid 1:3:6. | $Pr_{1n}$-methylindol | Yellow. |

Having now described my invention and in what manner the same is to be performed, what I claim as new, and desire to secure by Letters Patent, is—

1. The process for producing new azo dyestuffs by first combining diazo compounds containing sulfonic groups with derivatives of the indol group and secondly isolating the dyestuffs thus obtained, substantially as hereinbefore described.

2. The process for producing a new azo dyestuff by first combining diazotized parasulfanilic acid with alpha-methylindol and secondly isolating the dyestuff thus produced, substantially as hereinbefore described.

3. The herein-described new azo dyestuffs derived from indol derivatives and diazo compounds containing sulfonic groups, which dyestuffs are, when dry and pulverized, from yellow to brown powders soluble in water and in ammonia and dyeing wool from yellow to orange and to brown shades, substantially as hereinbefore described.

4. The herein-described new azo dyestuff derived from parasulfanilic acid and alpha-methylindol, which is, when dry and pulverized, a yellow powder soluble in water, alcohol, ammonia and concentrated sulfuric acid of 66° Baumé with a yellow color, dyeing wool greenish-yellow shades fast to light, acids and alkalies, substantially as hereinbefore described.

In testimony whereof I have signed my name in the presence of two subscribing witnesses.

FRIEDRICH RUNKEL.

Witnesses:
OTTO KÖNIG,
EMIL BLUMBERG.